United States Patent [19]

Malone et al.

[11] Patent Number: 5,402,511
[45] Date of Patent: Mar. 28, 1995

[54] METHOD OF FORMING AN IMPROVED TAPERED WAVEGUIDE BY SELECTIVELY IRRADIATING A VISCOUS ADHESIVE RESIN PREPOLYMER WITH ULTRA-VIOLET LIGHT

[75] Inventors: Steven A. Malone, Eatontown; Arthur Paolella, Howell; Dana J. Sturzebecher, Tinton Falls, all of N.J.

[73] Assignee: The United States of America as represented by the Secretary of the Army, Washington, D.C.

[21] Appl. No.: 77,170

[22] Filed: Jun. 11, 1993

[51] Int. Cl.⁶ .............................. G02B 6/00; G02B 6/36
[52] U.S. Cl. ............................................ 385/43; 385/48
[58] Field of Search ...................... 385/43, 14, 39, 48, 385/50

[56] References Cited

U.S. PATENT DOCUMENTS

| 3,948,583 | 4/1976 | Tien | 385/14 |
| 4,357,072 | 11/1982 | Goodfellow et al. | 385/91 |
| 4,585,299 | 4/1986 | Strain | 385/14 |
| 4,744,661 | 5/1988 | Ulbers et al. | 385/14 X |
| 4,762,382 | 8/1988 | Husain et al. | 385/14 X |
| 4,815,806 | 3/1989 | Owen | 385/27 |
| 4,834,492 | 5/1989 | Ishii et al. | 385/91 |
| 5,078,516 | 1/1992 | Kapon et al. | 385/14 X |
| 5,119,451 | 6/1992 | Wills et al. | 385/14 |
| 5,123,078 | 6/1992 | Thomas | 385/14 X |
| 5,159,700 | 10/1992 | Reid et al. | 385/14 |

FOREIGN PATENT DOCUMENTS 493815 3/1992 Japan .

OTHER PUBLICATIONS

Ozeki et al, "Tapered section of multimode cladded fibers as mode filters and mode analyzers", Applied Physics Letters, vol. 26, No. 7, 1 Apr. 1975.
Krchnavek et al, "Laser direct writing of channel waveguides using spin-on polymers", J. Appl. Phys. 66(11), 1 Dec. 1989.

Primary Examiner—Akm E. Ullah
Attorney, Agent, or Firm—Michael Zelenka; William H. Anderson

[57] ABSTRACT

A tapered waveguide for transmitting optical signals from a signal source to an optical fiber is fabricated by irradiating a layer of prepolymer resin on a substrate with a converging beam of ultraviolet light, whereby the irradiated resin polymerizes into a clear, hard polymer and the resin that has not been irradiated remains in its resinous state. The unpolymerized resin is removed with an organic solvent. The variation in width of the waveguide is achieved by varying the distance between the source of the converging beam of ultraviolet light, thereby varying the diameter of the spot that is being irradiated, while simultaneously moving the source of ultraviolet light parallel to the axis of the waveguide. Variation in thickness of the waveguide is achieved by sloping the substrate.

10 Claims, 1 Drawing Sheet

METHOD OF FORMING AN IMPROVED TAPERED WAVEGUIDE BY SELECTIVELY IRRADIATING A VISCOUS ADHESIVE RESIN PREPOLYMER WITH ULTRA-VIOLET LIGHT

GOVERNMENT INTEREST

The invention described herein may be manufactured, used, and licensed by or for the Government for governmental purposes without the payment to us of any royalty thereon.

FIELD OF INVENTION

This invention relates to a tapered waveguide for optical signals and a method of manufacturing such a tapered waveguide for coupling laser sources on microwave monolithic integrated circuits to optical fibers. More specifically, it relates to tapered waveguides allowing the propagation of optical signals with low attenuation in the forward direction and with high attenuation in the reverse direction.

BACKGROUND OF THE INVENTION

In the area of chip-level integration of microwave and photonic components, an important objective that must be achieved is the efficient optical coupling of optical fibers with optical components on the chip. If a laser is fabricated on the chip to generate an outgoing optical data signal, reflections of such signals from the fiber endface or from an external modulator back into the laser cavity must be minimized to avoid the generation of noise, which impairs the signal quality. Optical connectors allowing the efficient passage of optical signals in one direction and virtually blocking the transmission of optical signals in the reverse, therefore, are essential components for interconnecting microwave and photonic components.

Ozeki et al. (Applied Physics Letters, Vol. 26, No. 7, Apr. 1, 1975 describe biconically tapered cladded optical fibers for filtering higher-order modes of optical signals.

Krchnavek et al. (J. Appl. Phys. 66 (11), Dec. 1, 1989) disclose the fabrication of optical channel waveguides on oxidized silicon wavers using an adhesive which is cured by irradiation with ultraviolet light.

Oda (Japan 4-93815, March 1992) describes an optical isolator made of a magnetic semiconductor, such as CdMnTe, on a gallium arsenide (GaAs) substrate to convert modes of optical signals by application of an electrical and a magnetic field.

U.S. Pat. No. 4,834,492 (Ishii, et al., May 30, 1989), U.S. Pat. No. 4,729,163 (Goodwin et al., Jan. 19, 1988), and U.S. Pat. No. 4,779,946 (Pimpinella et al., Oct. 25, 1988) provide means for the alignment of the optical axes of light-generating devices and optical fibers.

U.S. Pat. No. 5,119,451 (Wills et al., Jun. 2, 1992) provides methods for fabricating optical waveguides for interconnecting inegrated circuit devices.

U.S. Pat. No. 4,357,072 (Goodfellow et al., Nov. 2, 1982) provides a method for sealing an optical fiber to a light-emitting diode.

U.S. Pat. No. 4,815,806 (Owen, Mar. 28, 1989) provides apparatus for launching laser light into an optical fiber which prevents reflection back into the laser cavity and suppresses establishment of an interfering standing wave in the laser cavity.

SUMMARY OF THE INVENTION

The present invention provides a tapered waveguide of for optical signals and a method for fabricating a tapered wave guide for interconnecting a laser light source and an optical fiber which allows the passage of light signals emitted by the laser to pass into the optical fiber with very low attenuation, but which effectively blocks the passage of reflected light from the optical fiber back into the laser by reflecting and dissipating such reflected light to the surroundings.

The tapered configuration of the waveguide, both in terms of width and thickness, ensures that optical signal transmission in the direction from the narrow end (the end connected to the laser light source) towards the wide end of the waveguide (the end connected to an optical fiber) is virtually complete, with oblique signal components being directed by internal reflection from the waveguide boundary in the direction of signal transmission. Optical signals traveling in the opposite direction through the waveguide are reflected and re-reflected by the tapering boundary of the waveguide until their angle of incidence becomes less than the critical angle of total internal reflection, at which point the signals pass through the boundary of the waveguide and are dissipated to the surroundings.

The tapered wave guide is formed by selectively irradiating a viscous adhesive resin prepolymer with ultraviolet light, whereby, the prepolymer is cured into a hard, clear polymer in the area irradiated by photon-induced polymerization, or photopolymerization.

The features and details of the invention will become apparent in light of the ensuing detailed disclosure and the drawings.

DETAILED DESCRIPTION OF THE PREFERRED EMBODIMENT

Figure 1:
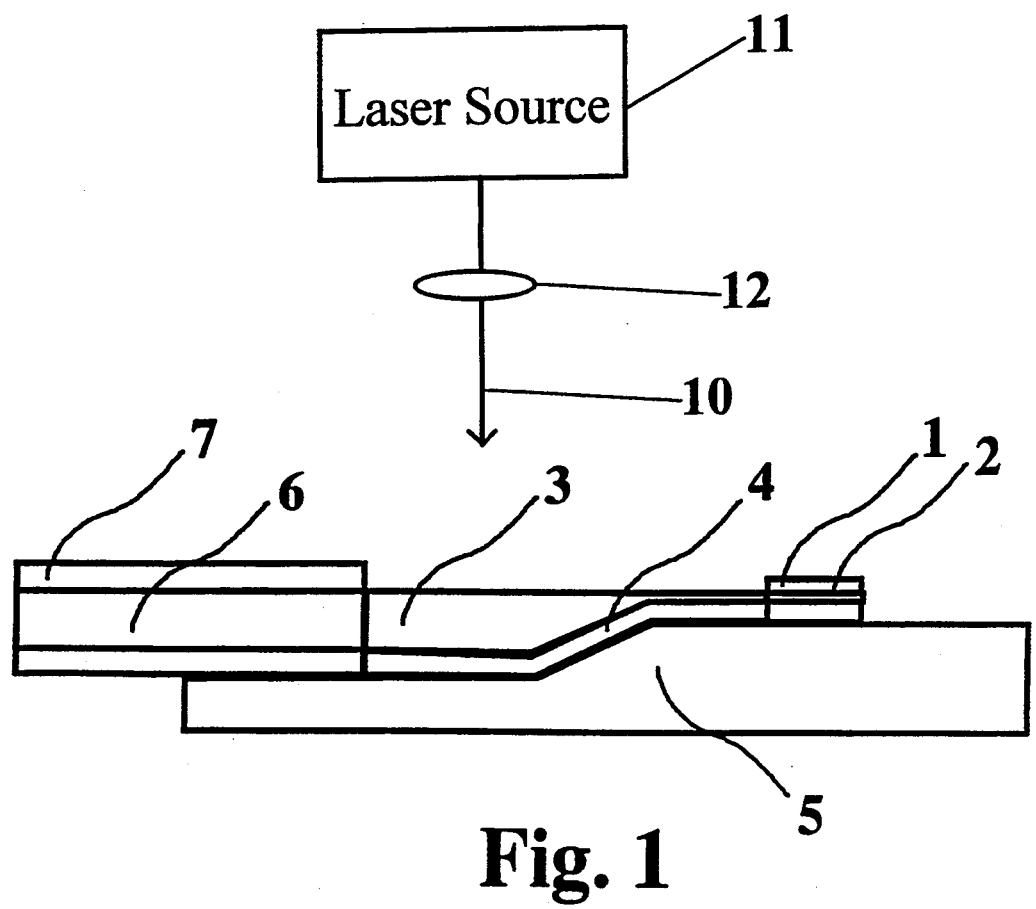
FIG. 1 is a side view of the tapered wave guide.

The tapered waveguide of this invention is used for interconnecting a laser chip with an optical fiber. It has a varying cross-sectional area and comprises a section, for connecting to the laser chip, with a small cross-sectional area, a tapered mid-section of increasing cross-sectional area, and a section having a large cross-sectional area for connecting to the optical fiber.

The tapered wave guide is formed on a flat substrate by irradiation of a viscous, clear, liquid prepolymer resin with ultraviolet light in the 320–380 nanometer wavelength range, whereby a hard, clear polymer is formed with a refractive index of about 1.56.

In the following discussion, the plane of the substrate will be referred to as horizontal, the direction normal to the plane of the substrate will be referred to as vertical and the dimension of the waveguide in the vertical direction will be referred to as its thickness. The dimension of the waveguide along the axis of the optical signal transmission will be referred to as its length. The dimension of the waveguide at right angles with its axis will be referred to as its width.

A variety of prepolymer resins, such as urethane diacrylates (low-refractive-index material for waveguide cladding) and epoxy diacrylates (high-refractive-index material for waveguides), may be used. The preferred prepolymer resin for fabricating waveguides is provided by Norland Products, Inc., under the designation "Norland Optical Adhesive 61." NORLAND 61 @ is available from Norland Products Inc., P.O. Box 145, North Brunswick, N.J. 08902.

The source of ultraviolet light for irradiation of the prepolymer preferably is an argon-ion laser (wavelength=350 nanometers), or a helim-cadmium laser (wavelength=325 nanometers). However, monochromatic laser light is not, generally, needed to induce the prepolymer resin to polymerize. Any irradiation in the 320–380 nanometer wavelength range is suitable for inducing polymerization. The text of J. Appl. Phys. 66(11), Dec. 1, 1989 on the subject polymerization is incorporated herewith by reference.

The waveguide according to this invention is formed on a gallium arsenide (GaAs) substrate (refractive index, 3.4) covered by a silicon dioxide buffer layer (refractive index, 1.46) Alternatively, silicon or indium phosphide (InP) substrates may be used.

The waveguide material (refractive index 1.56) must be surrounded on all sides by material having a lower refractive index than the waveguide material itself; this ensures that there is a critical angle of total internal reflection at the waveguide/buffer layer and waveguide/air interface which minimizes the loss of signal energy from the waveguide to the surroundings. On its underside, the waveguide is in contact with the buffer layer (refractive index 1.46) and along it sides and on top, it is in contact with air (refractive index 1.00).

The prepolymer resin is applied to the buffer layer covering the substrate; it is spun in a centrifuge at about 2000 rpm for a few seconds to spread the resin evenly by centrifugal force. Variable thickness in the waveguide is achieved by sloping the substrate and buffer layer surface in a selected area with respect to the plane of the substrate. The waveguide, as a result, has a horizontal top surface and a sloping underside, which provide variable thickness.

Variable width in the waveguide is achieved by varying the width of the irradiating ultraviolet light beam as it travels along the axis of the wave guide. The prepolymer resin, where it has been irradiated by the ultraviolet light beam, quickly polymerizes and hardens into a clear, transparent polymer which is not soluble in solvents. Where the resin has not been irradiated, it remains soft and soluble in solvents. The unpolymerized prepolymer resin is dissolved and removed by a solvent, such as acetone, and the polymerized waveguide having the desired taper is left behind on the substrate and buffer layer.

With reference to FIG. 1, laser chip 1 having a laser-active region 2 emits optical signals. They pass into the waveguide 3 which is formed by polymerizing the prepolymer resin at one end which has a small cross-sectional area, continue through the tapered mid-section of the waveguide, and exit at the opposite end having a large cross-sectional area, and pass into the optical fiber core 6 surrounded by cladding 7. The waveguide 3 adheres to a buffer layer 4, made of silicon dioxide, which in turn is supported by substrate 5, made of gallium arsenide, silicon, or indium phosphide.

Figure 2:
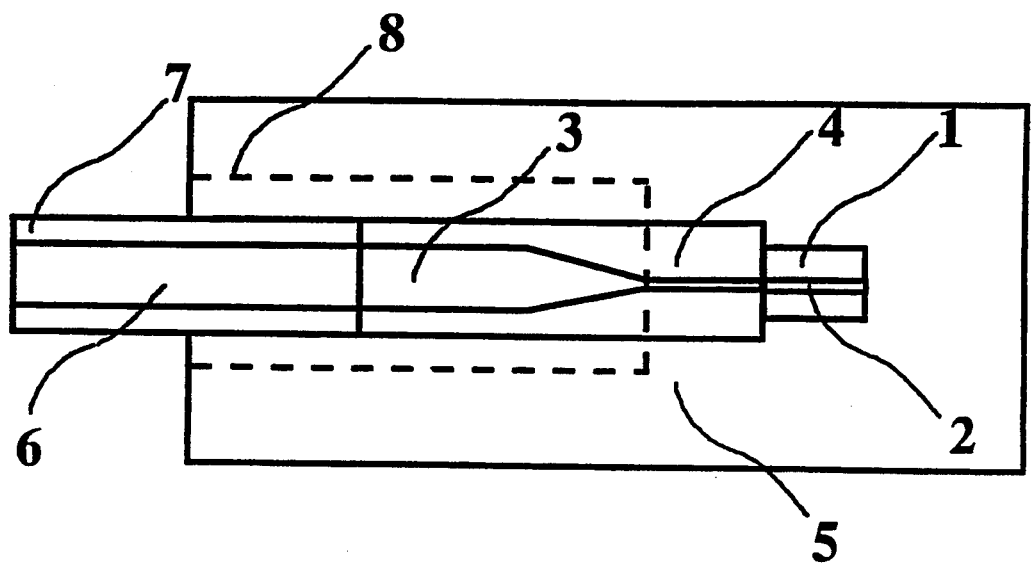
FIG. 2 is a top view of the tapered wave guide.

With reference to FIG. 2, the dashed line 8 defines the limits of an area on the substrate 5 which is sloped downward and recessed to allow the formation of the mid-section of waveguide 3 having varying thickness along its axis, and to accommodate the thickness of the optical fiber 6 and one layer of cladding 7 at the point of attachment to the waveguide.

Variation of the width of the ultraviolet beam during irradiation of the prepolymer resin is achieved by passing the laser beam 10 from a laser light source 11 through a lens, 12 whereby a converging light beam is formed, and varying the distance between the chip and the laser light source as the beam travels along the axis of the waveguide. The diameter of the spot irradiated when the system is in exact focus is 2–5 microns; when the distance between the chip and the laser is decreased, the diameter of the irradiated spot increases up to about 50 microns. The rate of travel of the beam in an axial direction is about 100 microns/second, and the time of irradiation of the prepolymer resin at any one spot is about 50 milliseconds.

In the tapered mid-section of the waveguide, the thickness and width of the waveguide, generally, vary linearly with axial distance and increase in the direction towards the optical fiber; however, other patterns of variation in thickness and width are within the scope of this invention.

The dimensions of the waveguide thus formed are approximately as follows: length, 500–1,000 microns; cross section at exit of laser chip, 2–5 microns square; and cross section at interface with optical fiber, 25–75 microns square, preferably about 50 microns square. These dimensions are approximate and are not to be construed as limiting.

The foregoing disclosure and description of the invention are merely illustrative and explanatory. Various changes in the size, shape, and materials of construction, as well as in the details of construction and operation, may be made within the scope of the appended claims.

What is claimed is:

1. A method for fabricating tapered waveguides for interconnecting a laser source and an optical fiber comprising the steps of:
    applying a layer of a prepolymer resin to a substrate;
    directing a converging beam of ultraviolet light from an ultraviolet light source onto a surface of the layer of prepolymer resin, wherein a spot of the resin surface is irradiated;
    varying the diameter of the irradiated spot while, simultaneously, moving the ultraviolet light source parallel to the surface of the prepolymer resin layer wherein the resin thus irradiated polymerizes into a hard polymer waveguide having a tapered width tapering from the laser source to the optical fiber.

2. The method of claim 1 wherein a predetermined area of the substrate is sloped, whereby a waveguide of varying thickness having a horizontal top surface and sloping underside is formed.

3. The method of claim 1 wherein the prepolymer resin is an epoxy diacrylate resin.

4. The method of claim 1 wherein the ultraviolet light has wavelengths ranging from 320 to 380 nanometers.

5. The method of claim 4 wherein the ultraviolet light source is an argon ion laser.

6. The method of claim 4 wherein the ultraviolet light source is a helium-cadmium laser.

7. The method of claim 1 wherein the converging beam is formed by passing the light from the ultraviolet light source through a convex lens.

8. The method of claim 1 wherein the substrate is selected from the group consisting of gallium arsenide, silicon, and indium phosphide.

9. The method of claim 1 wherein the substrate has on its surface a buffer layer of silicon dioxide, and wherein the prepolymer resin is applied to the buffer layer.

10. The method of claim 1 wherein the application of the layer of prepolymer resin is assisted by centrifugal force in a centrifuge.

* * * * *